Figure 2A:
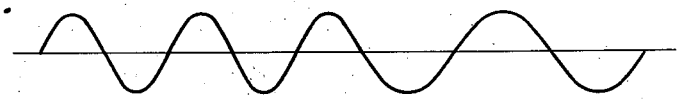

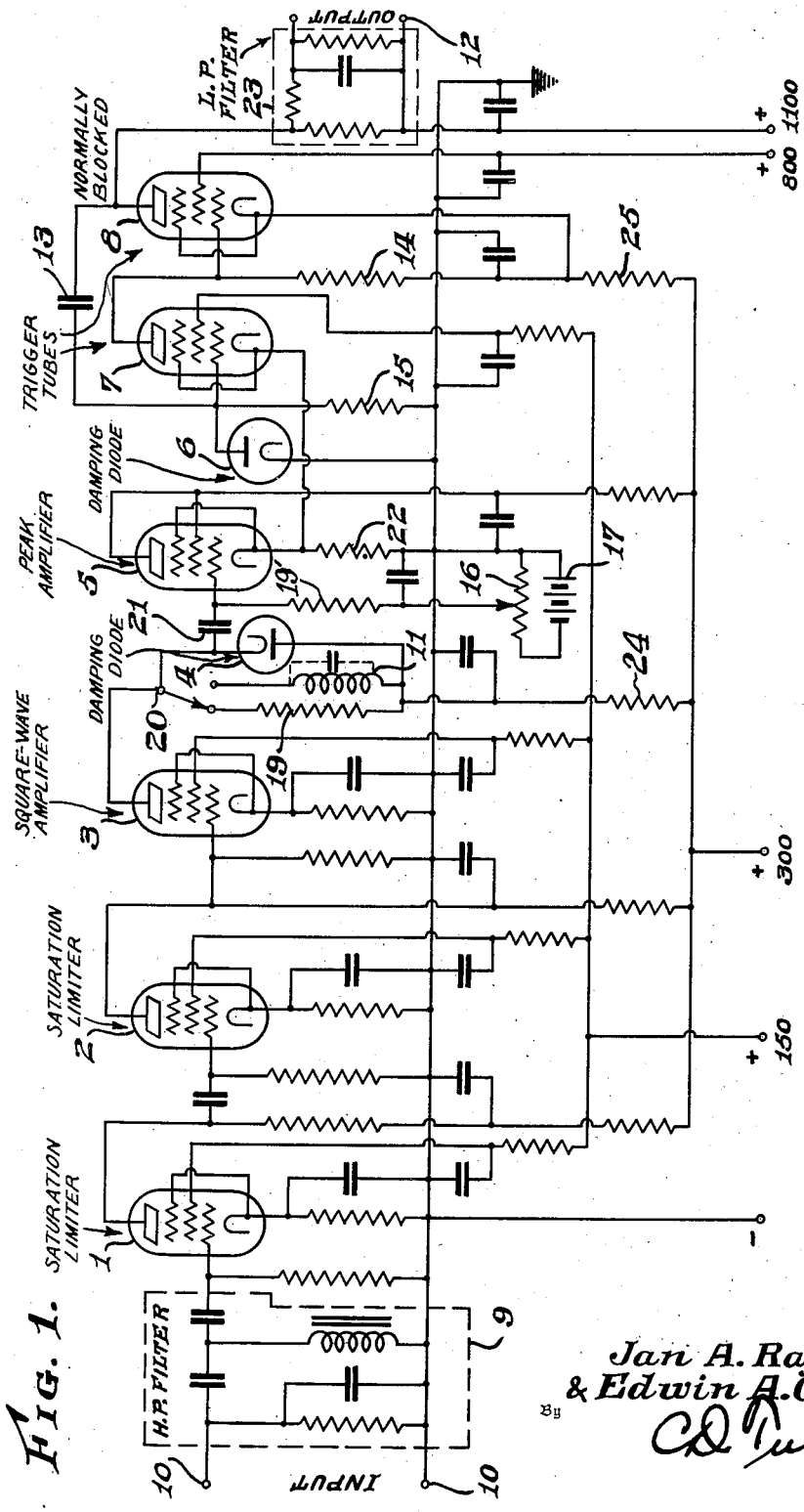

April 19, 1949.     J. A. RAJCHMAN ET AL     2,467,777
FREQUENCY MEASURING CIRCUIT Filed April 1, 1942                           2 Sheets-Sheet 2

Inventors
Jan A. Rajchman
& Edwin A. Goldberg
By
Attorney

Patented Apr. 19, 1949

2,467,777

UNITED STATES PATENT OFFICE 2,467,777

FREQUENCY MEASURING CIRCUIT

Jan A. Rajchman, Philadelphia, Pa., and Edwin A. Goldberg, Haddon Heights, N. J., assignors to Radio Corporation of America, a corporation of Delaware Application April 1, 1942, Serial No. 437,260

2 Claims. (Cl. 250—27)

This invention relates generally to frequency measuring circuits and particularly to a frequency measuring circuit in which a current is derived which is substantially proportional in amplitude to the average frequency of a signal applied to the input of the circuit.

The invention utilizes a unique arrangement of thermionic tube circuits including a high pass filter, one or more saturation amplifiers, a differentiating circuit, a peak amplifier, and a novel trigger circuit, as well as means for damping the differentiating circuit and the trigger circuit.

Among the objects of the invention are to provide means for deriving a current or voltage proportional in amplitude to the average frequency of a signal to be measured. Another object of the invention is to provide means for measuring the average frequency of an applied signal by pulsing said signal, by applying said pulses to a trigger circuit and deriving a current from said trigger circuit which is proportional in amplitude to the average frequency of the applied signal. Still another object is to provide a novel trigger circuit from which may be derived a current proportional in amplitude to the average frequency of the signal applied to key the trigger circuit.

The invention will be described hereinafter by reference to the drawings, of which Fig. 1 is a schematic circuit diagram of the invention; and Fig. 2 is a series of graphs indicating the operation of the various circuit components.

Referring to Fig. 1, signals from any suitable source, which may include a plurality of frequency components, are applied to the input terminals 10 of a filter circuit 9 which is designed to pass the frequency band to be measured. The output of the filter 9 is applied to the grid circuit of a first thermionic tube 1. The grid bias is adjusted to limit the amplitude of the signals to be measured in order to eliminate, as much as possible, response to extraneous signals such as harmonics higher than the fundamental frequency. The first tube 1 is operated at the saturation portion of its static characteristic in order to derive an output signal which is substantially of square wave form. The signal is further amplified by a second thermionic tube 2 which is also operated at the saturation point of its static characteristic in order to further improve the square wave form of the signal. The signal of substantially square wave form is next applied to the input circuit of a third thermionic tube 3. The anode circuit of the third tube 3 includes a two-position switch 20 which is connected in one position to one terminal of a resistor 19 and in another position to one terminal of an inductor 11. The movable arm of the switch 20 is connected to the cathode of a first diode 4 and to one terminal of the capacitor 21. The remaining terminals of the resistor 19, inductor 11 and the anode of the diode 4 are all connected through an anode resistor 24, to the source of high potential for the anode of the third tube 3. The remaining terminal of the capacitor 21 is connected to the control electrode of a peak amplifier 5, which is biased to amplify only the voltage peaks of the applied signal. The cathode circuit of the peak amplifier 5 includes a cathode resistor 22. Voltage across this resistor is applied to the cathode circuit of a first trigger tube 7. The control electrode of the first trigger tube 7 is connected to the anode of a second diode 6, to one terminal of the grid resistor 15, and to one terminal of the capacitor 13. The cathode of the second diode 6 and the remaining terminal of the resistor 15 are connected to ground. The remaining terminal of capacitor 13 is connected to the anode of a second trigger tube 8 and to one terminal of a resistance network 23. The remaining input terminal of the resistance network 23 is connected to a source of anode potential for the second trigger tube 8. The anode of the first trigger tube 7 is connected to the control electrode of the second trigger tube 8 and to one terminal of a coupling resistor 14. The remaining terminal of the resistor 14 is connected through the resistor 25 to a source of anode potential for the first trigger tube 7.

The operation of the circuit is as follows: The desired frequency component of the signal to be measured is derived from the filter 9 and applied to the control electrode of the first tube 1 which provides high amplification and, because of its saturation characteristics, clips the peaks of the signal wave. The signal is further amplified and clipped by a similar action in the second tube 2 and applied as a signal of substantially square wave form to the input of the third tube 3. When the switch 20 is connected to the inductor 11, the third tube 3 is operated to shock-excite the tuned circuit comprising the natural resonant characteristics of the inductor 11, to derive a series of pulses of decreasing amplitude from each square wave pulse applied to the circuit. The first diode 4 provides considerable damping of the pulses of decreasing amplitude to eliminate substantially all of the pulse signal except the first positive alternation. The resistance capacity network 19'—21 acts as a differentiating circuit. In this network the voltage across the resistor 19' will be substantially proportional to the rate of change of the square wave signal applied to the network and will therefore include only a sharp positive and negative pulse for each cycle of the square wave signal. When the switch 20 is connected to the resistor 19, the damping diode 4 may be omitted, since it will have little effect on the circuit operation.

Signals derived from the circuit with either position of the switch 20 are then applied as pulses to the control electrode of the peak amplifier 5. If desired, either the inductor 11 or the resistor 19, and the switch 20 may be omitted. The peak amplifier is biased to amplify only the positive peak portion of the pulse applied to the control electrode. Sharply peaked voltages from the cathode circuit of the peak amplifier 5 are applied to the input circuit of the first trigger tube 7.

The operation of the trigger circuit is as follows: The first trigger tube 7 is biased so that it is normally conducting while the second trigger tube 8 is biased so that it is normally non-conducting. When a positive pulse from the peak amplifier 5 is applied to the cathode of the first trigger tube 7, the first trigger tube 7 is biased to cut-off and the second trigger tube 8 is made to conduct. This condition continues after the exciting pulse has passed, and until the grid of the first trigger tube 7, which has been driven to cut off by the charge on the capacitor 13, becomes sufficiently positive for the first trigger tube 7 to again become conducting and the second trigger tube 8 non-conducting. For a single exciting pulse, the time during which the second trigger tube 8 will become conducting depends upon the capacitance of the capacitor 13, the grid capacitance of the first trigger tube 7, the resistance of the resistors 14 and 15, the cut-off voltage of the first trigger tube 7, and the rate of change of the maximum voltage on the anode of the second trigger tube 8 when the tube is suddenly made to conduct. Since all of these constants can be calculated and fixed, the circuit can be adjusted to any desired time constant.

The limit frequency of the circuit is dependent on the time required for the trigger tubes to return to their normal bias condition after actuation by an exciting pulse. This time interval may be greatly reduced by the use of the second diode 6 which has a damping action on the grid circuit of the first trigger tube 7 by providing substantial attenuation in the circuit when the grid of the first trigger tube 7 is at positive potential. The action of the diode 6 also tends to make the duration of the current pulse in the anode circuit of the second trigger tube 8 more uniform. The amplitude of this pulse may be maintained at a substantially constant level by proper voltage regulation of the potentials applied to the trigger tube circuits. The current derived from the output terminals 12 of the resistance network 23 will be a fairly accurate indication of the average rate of occurrence of the exciting pulses applied to the cathode of the first trigger tube 7.

Figure 2B:
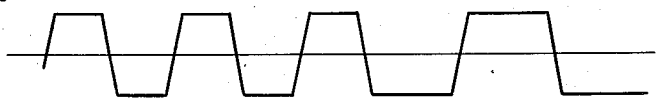
Figure 2C:
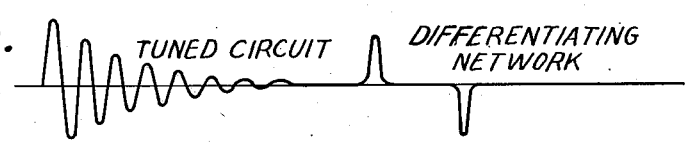
Figure 2D:
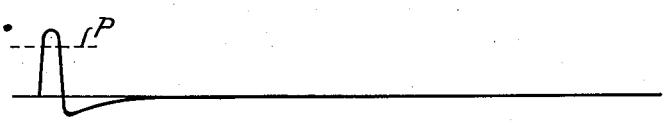
Figure 2E:
Figure 2F:
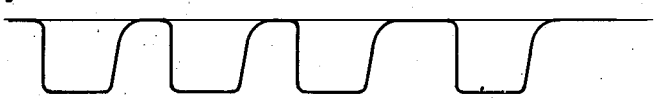
Figure 2G:
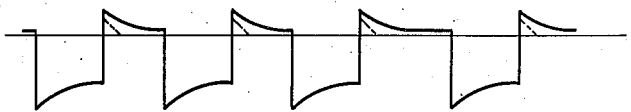

Fig. 2a of the drawing shows a typical sine wave signal applied to the input circuit of the first saturation amplifier tube 1. Fig. 2b shows a signal of substantially square wave form derived from the anode circuit of the second tube 2 and applied to the input circuit of the tube 3. Fig. 2c shows the wave form comprising pulses of diminishing amplitude derived from the tuned circuit 11 when the switch 20 is connected to the inductor 11. The right-hand portion shows the wave-form derived from the differentiating network 19', 21 when the switch 20 is connected to the resistor 19. Fig. 2d shows the damping of the pulse current by the first diode 4. The portion of the graph above the dash line P indicates the positive portion of the pulse current which actuates the peak amplifier 5. Fig. 2e shows the positive pulse derived from across the resistor 22 in the cathode circuit of the peak amplifier 5. Fig. 2g shows the potential variations on the grid of the first trigger tube 7 caused by the application to the tube cathode of the pulse shown in Fig. 2e. Fig. 2f shows the corresponding potential variations in the anode circuit of the second trigger tube 8 which are applied to the resistance network 23. The dashed lines in Fig. 2g indicate the damping action of the second diode 6 and clearly show the action of this tube in decreasing the time required for the trigger tubes 7 and 8 to return to their normal bias condition.

It should be understood that the filter 9, tubes 1, 2, 3, 4 and 5, or any of them, may be omitted if the signal to be measured has suitable characteristics for the actuation of the trigger circuit comprising the tubes 6, 7, and 8. It should also be understood that the second diode 6 may be omitted if the operating frequency of the circuit is sufficiently low to permit the trigger tubes 7 and 8 to return to normal bias condition without the damping action of the diode 6.

We claim as our invention:

1. The combination of means for producing an alternating voltage having a flat-topped wave form, means for differentiating said wave to produce voltage pulses at the beginning and end of said wave, a detector having a cathode and control grid, a resistor connected in series with said cathode, means for biasing said grid to a predetermined negative potential, means for applying said pulses to said grid, a multivibrator including first and second electron discharge elements having their grids and anodes cross-connected so that current conduction is normally in the first of said elements, means connecting said resistor between the grid and cathode of the first of said elements so that current conduction is temporarily transferred to the second of said elements in response to the voltage pulse detected by said detector, and a low frequency pass filter connected in the anode circuit of the second of said elements.

2. The combination of means for producing an alternating voltage having a flat-topped wave form, means for differentiating said wave to produce voltage pulses at the beginning and end of said wave, a detector having a cathode and control grid, a resistor connected in series with said cathode, means for biasing said grid to a predetermined negative potential, means for applying said pulses to said grid, a multivibrator including first and second electron discharge elements having their grids and anodes cross-connected so that current conduction is normally in the first of said elements, means connecting said resistor between the grid and cathode of the first of said elements so that current conduction is temporarily transferred to the second of said elements in response to the voltage pulse detected by said detector, a second resistor connected in the anode circuit of the second of said elements, and a circuit in parallel with said second resistor including a third resistor connected in series with a capacitor and a fourth resistor.

JAN A. RAJCHMAN.
EDWIN A. GOLDBERG.

REFERENCES CITED

The following references are of record in the file of this patent:

UNITED STATES PATENTS

| Number | Name | Date |
|---|---|---|
| 1,933,219 | Nakajima et al. | Oct. 31, 1933 |
| 2,061,734 | Kell | Nov. 24, 1936 |
| 2,063,025 | Blumlein | Dec. 8, 1936 |
| 2,082,317 | Barber | June 1, 1937 |
| 2,161,146 | Echlin et al. | June 6, 1939 |
| 2,221,591 | Lansdale | Nov. 12, 1940 |
| 2,266,401 | Reeves | Dec. 16, 1941 |
| 2,272,070 | Reeves | Feb. 3, 1942 |
| 2,307,316 | Wolff | Jan. 5, 1943 |
| 2,323,596 | Hansell | July 6, 1943 |
| 2,362,503 | Scott | Nov. 14, 1944 |
| 2,405,843 | Moe | Aug. 13, 1946 |